United States Patent
Helmick

(10) Patent No.: US 10,644,471 B2
(45) Date of Patent: May 5, 2020

(54) SYSTEMS FOR MAINTAINING ORIENTATION OF AN ELECTRICAL CONNECTOR DURING AN ASSEMBLY PROCESS

(71) Applicant: THE BOEING COMPANY, Chicago, IL (US)

(72) Inventor: Eerik J. Helmick, Seattle, WA (US)

(73) Assignee: The Boeing Company, Chicago, IL (US)

( * ) Notice: Subject to any disclaimer, the term of this patent is extended or adjusted under 35 U.S.C. 154(b) by 817 days.

(21) Appl. No.: 14/848,411

(22) Filed: Sep. 9, 2015

(65) Prior Publication Data
US 2017/0070021 A1   Mar. 9, 2017

(51) Int. Cl.
*H01R 43/00*   (2006.01)
*H01R 43/16*   (2006.01)

(52) U.S. Cl.
CPC ........ *H01R 43/16* (2013.01); *Y10T 29/53217* (2015.01)

(58) Field of Classification Search
CPC ......... Y10T 29/53217; Y10T 29/53265; Y10T 29/53213; Y10T 29/49826; Y10T 29/53209; Y10T 29/49181; Y10T 29/5193; Y10T 29/49174; Y10T 29/53226; Y10T 29/53235; Y10T 29/5327; Y10T 29/49169; Y10T 29/49208; Y10T 29/5313; Y10T 29/491; Y10T 29/49194; Y10T 29/49915
USPC ........ 29/749, 33 F, 745, 747, 748, 753, 755, 29/863, 876, 33 M, 407.04, 407.1, 564.2, 29/703, 709, 751, 758, 825, 854, 868, 29/760
See application file for complete search history.

(56) References Cited

U.S. PATENT DOCUMENTS

| | | | | |
|---|---|---|---|---|
| 4,653,159 A | * | 3/1987 | Henderson | ....... H01B 13/01245 |
| | | | | 140/93 R |
| 4,820,204 A | * | 4/1989 | Batty | ................... H01R 13/514 |
| | | | | 439/681 |
| 5,099,572 A | | 3/1992 | Lazaro | |

(Continued)

FOREIGN PATENT DOCUMENTS

| | | |
|---|---|---|
| CN | 103944037 | 7/2014 |
| GB | 538538 | 8/1941 |
| JP | H0963740 | 3/1997 |

OTHER PUBLICATIONS

French Preliminary Search Report for FR 1657559 (end English translation), dated Jun. 29, 2018.

*Primary Examiner* — Thiem D Phan
(74) *Attorney, Agent, or Firm* — The Small Patent Law Group LLC; Joseph M. Butscher

(57) ABSTRACT

A connector support assembly is configured to securely retain a mating connector during an assembling process of an electrical connector. The connector support assembly may include a universal base including an insert channel, and a plurality of inserts configured to be interchangeably retained within the insert channel. Each of the inserts includes a base connection interface having a common shape and size that is configured to be retained by the base within the insert channel, and at least one shell connection interface. The shell connection interface(s) of at least two of the inserts differ in one or both of size and shape and are configured to retain different sized shells of different mating connectors.

37 Claims, 10 Drawing Sheets

(56) References Cited

U.S. PATENT DOCUMENTS

| | | | | |
|---|---|---|---|---|
| 5,365,807 A | * | 11/1994 | Darrah | B25B 23/0035 |
| | | | | 403/108 |
| 6,814,625 B2 | * | 11/2004 | Richmond | H01R 13/6453 |
| | | | | 439/157 |
| 8,099,857 B2 | | 1/2012 | Shelley | |
| 2006/0185158 A1 | * | 8/2006 | Kuhn | H01R 43/26 |
| | | | | 29/755 |

* cited by examiner

SYSTEMS FOR MAINTAINING ORIENTATION OF AN ELECTRICAL CONNECTOR DURING AN ASSEMBLY PROCESS

FIELD OF THE DISCLOSURE

Embodiments of the present disclosure generally relate to systems and methods for assembling an electrical connector, and, more particularly, to systems and methods for maintaining and preserving an orientation of an electrical connector during an assembly process.

BACKGROUND OF THE DISCLOSURE

Automated systems are used to assemble a variety of devices and structures. One type of system may include multiple robotic systems that are used to form an electrical connector, including a shell, a grommet, and electrical wires. For example, a robotic system may include an arm with an operative end that securely and precisely connects electrical wires to a grommet that connects to a shell.

In order to precisely and accurately form an electrical connector, the shell is securely mounted to a connector support. Typically, the connector support includes a base. A fixed support pedestal is integrally formed with the base and extends upwardly therefrom. The fixed support pedestal includes one or more unique retaining features that are configured to securely retain a specific type of connector shell having a defined size and shape. For example, the support pedestal may include an annular channel that is sized and shaped to receive a portion of a particular connector shell having a unique size and shape. As another example, the support pedestal may include a retaining channel that is sized and shaped to receive and retain a portion of a particular connector shell having a unique size and shape.

In general, a connector support includes a fixed, hard locating machined fixture that mates to a connector. For each different type of connector there is a specialized and unique connector support. A manufacturer of a wide variety of electrical connectors typically stores corresponding connector supports for each type of electrical connector. Moreover, each connector shell is typically manually secured to a support pedestal, such as through threading, keying, and/or the like. As can be appreciated, the process of assembling components may be expensive (in that a large number of separate and distinct connector supports are used and stored), and time and labor intensive (in that each connector shell is manually secured to a connector support).

Accordingly, a need exists for an efficient automated system and method of assembling components, such as electrical connectors.

SUMMARY OF THE DISCLOSURE

Certain embodiments of the present disclosure provide a connector support assembly that is configured to securely retain a mating connector during assembly of an electrical connector (in which the electrical connector includes the mating connector and various other components secured thereto, such as wires, seals, and the like). The connector support assembly may include a universal base having an insert channel. A plurality of inserts are configured to be interchangeably retained within the insert channel. Each of the inserts includes a base connection interface (such as an outer perimeter wall) having a common shape and size that is configured to be retained by the base within the insert channel, and at least one shell connection interface. The shell connection interface(s) of at least two of the inserts differ in one or both of size or shape and are configured to retain different sized shells of different mating connectors.

The universal base or the base connection interface may include a securing protuberance or a reciprocal notch, while the other of the universal base or the base connection interface may include the other of the securing protuberance or the reciprocal notch. The securing protuberance is retained by the reciprocal notch to prevent rotation of the inserts within the insert channel.

The universal base may include at least one hole that is configured to align with at least one pallet hole of a pallet to secure the universal base to the pallet through at least one fastener. The hole(s) may define a feature that is configured to be detected by a feature recognition system and compared with another feature of the mating connector to align the mating connector on the connector support assembly in a proper assembly orientation.

Each shell connection interface may include one or more of an upstanding rim, a recess, or a platform. In at least one embodiment, a single insert may include at least two separate and distinct shell connection interfaces, each of which is configured to retain a different sized or shaped shell. In at least one embodiment, a shell connection interface may include a plurality of arcuate segments separated by gaps. In at least one embodiment, a shell connection interface may include a spring-biased brace positioned within a recess and exerting an outward spring force into a rim. In at least one embodiment, a shell connection interface may include a block-shaped recess.

At least one insert may include wings extending from a central portion. A shell connection interface may extend between the wings and the central portion.

At least one insert may include a key that is configured to allow the mating connector to be manually aligned with respect to the insert in a proper assembly orientation.

Certain embodiments of the present disclosure provide a system for assembling an electrical connector. The system may include a mating connector, and a connector support assembly that retains a mating connector during an assembling process of the electrical connector. The connector support assembly may include a universal base including an insert channel, and an insert interchangeably retained within the insert channel. The insert may include a base connection interface having a shape and size that is the same as a plurality of other inserts, and at least one shell connection interface that differs in one or both of size or shape from at least one of the other inserts. The mating connector is firmly secured on or in the shell connection interface(s).

The system may also include a feature recognition system configured to detect a first feature of the mating connector and a second feature of the universal base. A proper assembly orientation between the first and second features is determined. For example, the feature recognition system may determine the proper assembly orientation. As another example, the system may include a control unit in communication with the feature recognition system. The control unit may determine the proper assembly orientation. The system may also include an engaging robot configured to move the mating connector into the proper assembly orientation in relation to the universal base and firmly secure the mating connector to the shell connection interface(s).

The system may also include a pallet on which the connector support assembly is secured, and a conveyor onto which the pallet is moveably secured. The system may also include at least one assembling station disposed along the conveyor. The mating connector secured on the connector support assembly is configured to be conveyed to the at least one assembling station on the pallet by way of the conveyor.

Certain embodiments of the present disclosure provide a method for assembling an electrical connector. The method may include interchangeably securing an insert within an insert channel of a universal base to provide a connector support assembly that is configured to retain a mating connector during an assembling process of the electrical connector. The insert includes a base connection interface having a shape and size that is the same as a plurality of other inserts, and at least one shell connection interface that differs in one or both of size or shape from at least one of the other inserts. The method may also include firmly securing a mating connector on or in the shell connection interface(s).

DETAILED DESCRIPTION OF THE DISCLOSURE

Figure 1:
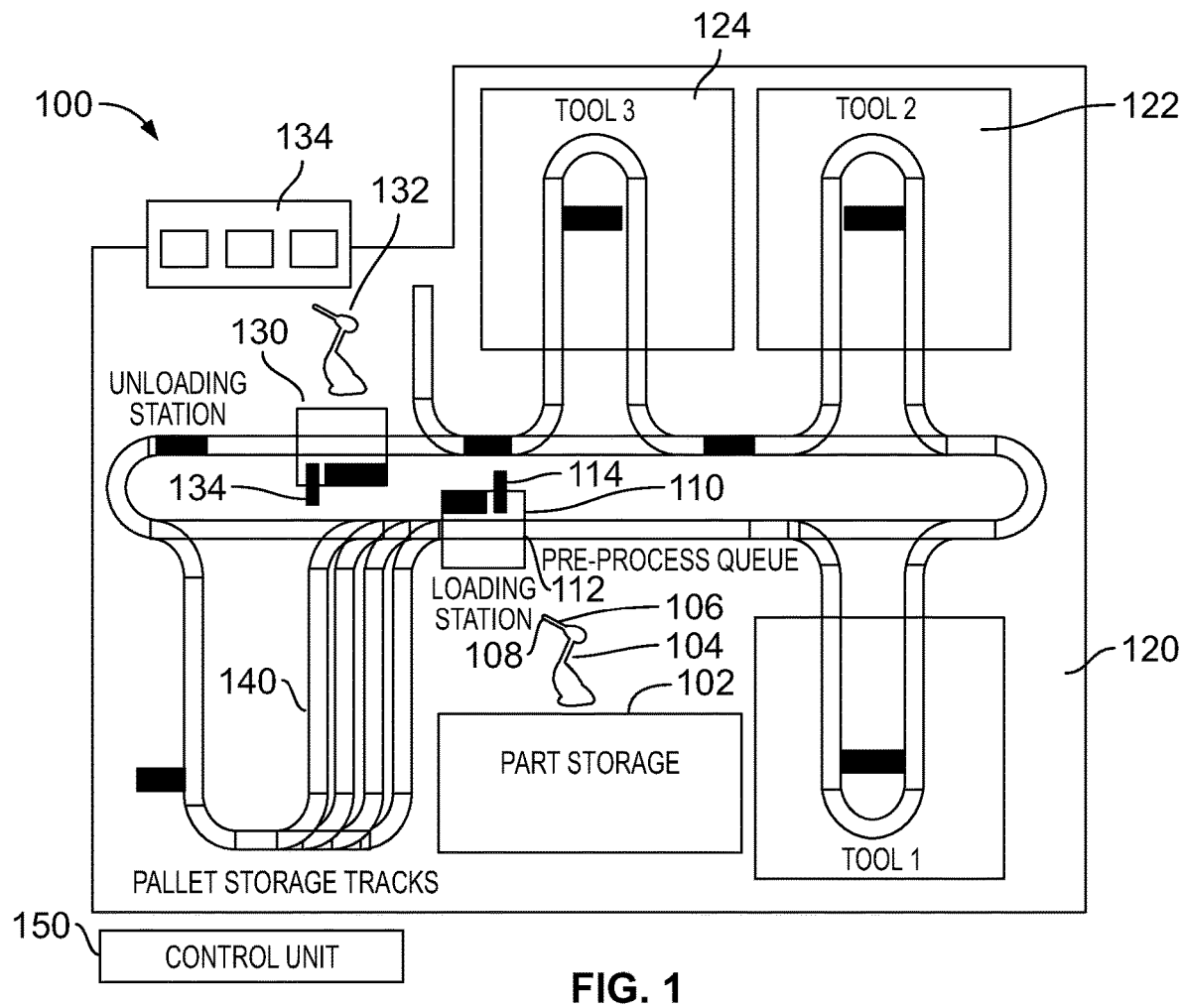
FIG. 1 illustrates a schematic diagram of a assembling system for an electrical connector, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a connector support assembly that may include a universal base that is configured to accept a plurality of different inserts, at least some of which may include different shell connector interfaces that are configured to securely retain a portion of an electrical connector, such as a shell. The portion of the connector may be configured to be press fit onto the insert, such as by an engaging robot, in order to preserve the orientation of the connector as it is conveyed to one or more assembling stations during an assembling process.

In an effort to automate methods of forming electrical connectors, including securing wires to portions of the connectors, a precise and exact orientation of the connector is maintained in order to accurately and efficiently secure components thereto. In known systems and methods, a tolerance between female and male mating connectors is generally not tight enough to allow robotic insertion of wires into grommet cavities, for example. Embodiments of the present disclosure provide systems and methods that preserve position and orientation of an electrical connector during an assembling process that may be based on a tight friction fit. Embodiments of the present disclosure provide assembling systems and methods that are simple and cost-effective.

In at least one embodiment, an engaging robot is used to secure an electrical connector to an insert of a connector support assembly. The connector support assembly may not include any keying features. Instead, the engaging robot cooperates with a feature recognition system (such as a vision system) to accurately place the connector on the insert. The accurate position of the connector on the insert enables alignment to a top grommet face or a dielectric portion. This embodiment eliminates, minimizes, or otherwise reduces any concern in offset between the connector shell and the grommet or dielectric cavities.

In at least one embodiment, an electrical connector may be manually secured to the insert of the connector support assembly. The connector support assembly may include one or more keying features, which may be used to properly orient the electrical connector on the connector support assembly. In such an embodiment, a feature recognition system may not be needed.

Certain embodiments provide a method of assembling an electrical connector. The method may include providing a connector (such as having installed plugs), positioning a feature recognition system (such as a vision system) over a top grommet of the connector (alternatively, location data can be preserved if recorded prior to taking a connector), processing feature data (such as image data), and aligning a feature (such as a mark, hole, protuberance or the like) of the grommet face with one or more features (such as a mark, hole, protuberance, or the like) of a base of a connector support assembly. The method may also include determining an offset between the connector and the connector support assembly, and calculating a final offset. The method may also include moving the connector to an automated system (such as an engaging robot) based on the calculated final offset, and pressing the connector onto the insert of the connector support assembly at the determined position. The automated system may then disengage the connector, which may then be positioned on a transport mechanism, such as a pallet, which may be used to convey the connector support assembly that supports the properly positioned and oriented connector to a assembling station.

Certain embodiments of the present disclosure provide a securement tool or connector support assembly that may include an insert and a base that interfaces with the insert via a standard interface. The standard interface may be tapered for ease of fit and location. The standard interface may include one or more keying features. A connector may be frictionally secured to a connection interface of the insert. The insert may be formed of injection-molded plastic, for example.

FIG. 1 illustrates a schematic diagram of a system 100 for assembling an electrical connector, according to an embodiment of the present disclosure. The system 100 may include a part storage pen 102, which may contain multiple electrical mating connectors. Each mating connector may include a shell and a grommet secured thereto. The system 100 may be configured to convey the mating connector between various assembling stations to secure additional components to the mating connector to form the electrical connector. That is, a fully-formed electrical connector includes the mating connector and one or more components secured thereto, such as conductive wires, contact terminals, seals, and the like.

An engaging robot 104 having an arm 106 and an end effector 108 is configured to grasp a particular mating connector from the part storage pen 102 and transfer the mating connector to a loading station 110, which may be disposed along a conveyor 112. The conveyor 112 (such as a moving conveyor line, track, or the like) may moveably support a pallet (not shown in FIG. 1). A connector support assembly (not shown in FIG. 1) may be supported on the pallet. As such, the pallet may moveably secure the connector support assembly on the conveyor 112.

The engaging robot 104 is configured to securely position the mating connector onto the connector support assembly. In order to properly position and orient the mating connector onto the connector support assembly, a feature recognition system 114 (such as a laser, infrared, visual, photogrammetry, or the like system) may be used to detect one or more features of the mating connector and one or more features of the connector support assembly. The engaging robot 104 may be in communication with the feature recognition system 114 and properly aligns the mating connector with the connector support assembly based on a comparison of the detected features. For example, the feature recognition system may visually detect a mark, protuberance, hole, channel, or the like on the mating connector and a mark, protuberance, hole, channel, or the like on a portion of the connector support assembly. The feature recognition system and/or a control unit (either within the feature recognition system, or in communication with the feature recognition system) may include hardware and software that is programmed to determine a proper relationship between the detected feature(s) of the mating connector with the detected feature(s) of the connector support assembly. The engaging robot may then move the mating connector relative to the connector support assembly so that the detected features are properly aligned with respect to one another. The engaging robot may then secure the mating connector to the connector support assembly in the proper position and orientation, such as through a press fit.

In at least one particular, non-limiting embodiment, the feature recognition system 114 may be positioned over a grommet of a mating connector and image the mating connector. The feature recognition system 114 may process the image to determine a position and orientation of a particular feature of the grommet, such as a line on an outer surface thereof. The feature recognition system 114 may then determine a proper alignment of the line for one or more assembling stages of the mating connector. The feature recognition system 114, which may be in communication with the engaging robot 104, directs the engaging robot 104 to move the mating connector to the proper alignment. The feature recognition system 114 may then detect one or more features of a base of the connector support assembly, such as holes that are used to align and secure the base to a pallet. The feature recognition system 114 may then determine an offset between the line of the mating connector and the holes of the base. The feature recognition system 114 determines the difference between the offset and a proper orientation of the line of the mating connector with the holes. The feature recognition system 114 may then direct the engaging robot 104 to move the mating connector in relation to the connector support assembly so that the line is in a determined proper relationship with the holes. The engaging robot 104 then operates the end effector 108 to secure (such as through a press fit) the mating connector to a connection interface of a shell that is secured to the base of the connector support assembly.

After the mating connector is positioned on the connector support assembly at a proper, preserved orientation, the engaging robot 104 disengages the mating connector. The connector support assembly may then be positioned on a pallet, which may then be conveyed to a assembling station by way of the conveyor 112. Optionally, the base of the connector support assembly may be initially secured to the pallet, and the engaging robot 104 may align and secure the insert to the base secured to the pallet.

After the mating connector is secured to the connector support assembly, the pallet, on which the connector support assembly may be positioned, may be conveyed to various assembling tools 120, 122, and 124 on the conveyor 112. The tools 120, 122, and 124 may be used to secure various components to the mating connector to form an electrical connector. For example, the tool 120 may secure conductive wires to a grommet of the mating connector. The tool 122 may position a seal around a portion of the mating connector. The tool 124 may position a mating interface on an end of the mating connector. More or less tools 120, 122, and 124 and stations than shown may be used.

After the electrical connector is formed through operation of the tools 120, 122, and 124, the electrical connector may be conveyed on the conveyor 112 (via the connector support assembly supported on a pallet) to an unloading station 130. An engaging robot 132 is used to remove the electrical connector from the connector support assembly. The engaging robot 132 may then transfer the formed electrical connector to a connector storage structure 134, such as a shelf, bucket, trough, or the like. The pallet and connector support assembly are then conveyed to pallet storage tracks 140 which connect to the loading station 110.

A control unit 150 may be in communication with the engaging robots 104 and 132, the feature recognition system 114, as well as the various tools 120, 122, and 124. For example, the control unit 150 may be in communication with these components through wired and/or wireless connections. The control unit 150 may be configured to control operation of the assembling system and method. For example, the control unit 150 may be configured to control operation of each of the components, including the feature recognition system 114, and the engaging robots 104 and 132. Optionally, each of the engaging robots 104 and 132 and the feature recognition system 114 may include a separate and distinct control unit. The control unit 150 (or each control unit) may include hardware and software that stores programs that are used to control operation of the various components of the system 100.

Figure 2:
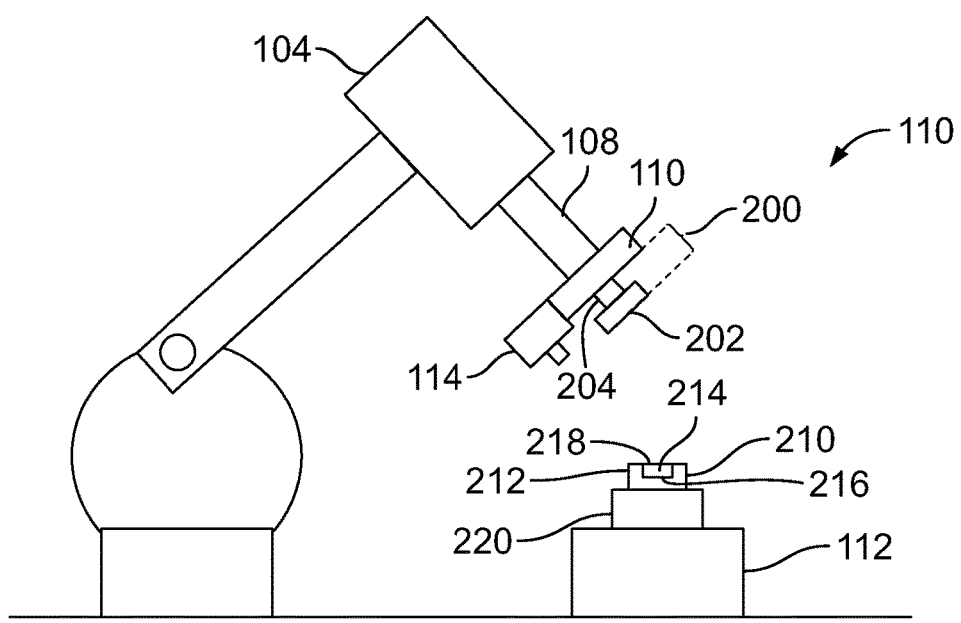
FIG. 2 illustrates a schematic diagram of a loading station, according to an embodiment of the present disclosure.

FIG. 2 illustrates a schematic diagram of the loading station 110, according to an embodiment of the present disclosure. The engaging robot 104 includes the arm 106 having the end effector 108. The end effector 108 grasps a mating connector 200, which may include a shell 202 and a grommet 204. The engaging robot 104 is configured to position the mating connector 200 onto a connector support assembly 210, which may include a base 212 and an insert 214. The base 212 may be a universal base 212 that is configured to accept a wide variety of inserts 214, each of which includes a commonly shaped and sized base connection interface 216, such as an outer perimeter of a main body. At least some of the inserts 214, however, may include different shell connection interfaces 218. The base 212 may be formed of metal, for example. Optionally, the base 212 may be formed of various other materials, such as plastic. The base 212 may be machined, three-dimensionally printed, injection molded, and/or the like. The inserts 214 may be formed of injection-molded plastic, for example. The inserts 214 may be machined, three-dimensionally printed, injection molded, and/or the like. Alternatively, the inserts 214 may be formed of various other materials, such as metals. The base 212 is configured to be repeatedly used with multiple different inserts 214. The inserts 214 may be formed of a material that is less expensive than the base 212, and may be disposable. As such, a common base 212 may be used to accept a wide variety of inserts 214, at least some of which may be configured to securely retain different types of mating connectors 200.

As shown in FIG. 2, the feature recognition system 114 may be secured to, or otherwise part of, the engaging robot 104. Optionally, the feature recognition system 114 may be separated from the engaging robot 104. As noted, the feature recognition system 114 may be or include a laser, infrared, visual, photogrammetry, or other such identification system.

As described above, the feature recognition system 114 may identify one or more features of the mating connector 200 and one or more features of the connector support assembly 210 in order to properly align the mating connector 200 with respect to the connector support assembly 210 for one or more assembling stages. The feature recognition system 114 may identify a proper orientation of the feature(s) of the mating connector 200 with the feature(s) of the connector support assembly 210. The engaging robot 104 may then properly orient the mating connector 200 in relation to the connector support assembly 210 based on the identified features.

The connector support assembly 210 may be positioned on a pallet 220 that is moveably retained by the conveyor 112. As such, the connector support assembly 210 may be conveyed on the conveyor 112 by the pallet 220. In at least one other embodiment, the conveyor 112 may be configured to moveably retain the base 212 of the connector support assembly 210, instead of using the separate pallet 220.

Figure 3:
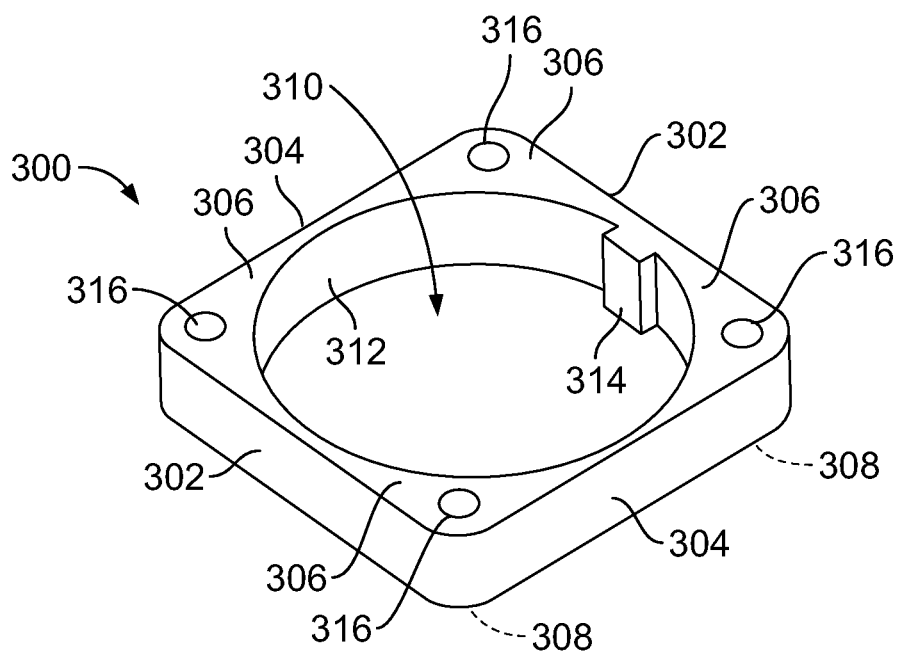
FIG. 3 illustrates a perspective top view of a base of a connector support assembly, according to an embodiment of the present disclosure.

FIG. 3 illustrates a perspective top view of a base 300 of a connector support assembly, according to an embodiment of the present disclosure. The base 300 is an example of the base 212 shown in FIG. 2. The base 300 may be formed of metal, for example. In at least one other embodiment, the base 300 may be formed of plastic.

The base 300 may include opposed end walls 302 connected to opposed lateral walls 304, upper corner surfaces 306, and lower corner surfaces 308. An insert channel 310 is defined by an internal wall 312 defined between the end walls 302 and the lateral walls 304. As shown, the internal wall 312 may be generally shaped as a circular opening. Optionally, the internal wall 312 may be shaped as various other shapes. The insert channel 310 defines an outer perimeter boundary of multiple inserts 214. That is, the insert channel 310 is configured to receive a plurality of inserts 214 having a commonly sized and shaped base connection interface, such as a commonly sized and shaped outer perimeter, but which may include different shell connection interfaces. The base connection interface 216 may be an outer perimeter wall of an insert 214 that is configured to abut into the internal wall 312 that defines the insert channel 310.

A securing protuberance 314 may extend inwardly from the internal wall 312 into the insert channel 310. The securing protuberance 314 may be a block, tab, post, or the like. The securing protuberance 314 is configured to securely mate with a reciprocal notch formed in an insert 214 to ensure that the insert 214 remains securely positioned within the insert channel 310. That is, the mating between the securing protuberance 314 and the reciprocal notch prevents the insert 214 from rotating within the base 300. While one securing protuberance 314 is shown, additional securing protuberances 314 may extend into the insert channel 310.

Holes 316 may be formed within the base 300. For example, the holes 316 may extend between and through the upper and lower corner surfaces 306 and 308. The holes 316 may be configured to accept fasteners and/or reciprocal protuberances (such as posts, studs, nubs, or the like) on a pallet to secure the base 300 to the pallet. Additionally, the holes 316 provide features that may be detected by the feature recognition system 114 (shown in FIGS. 1 and 2) as described above.

Figure 4:
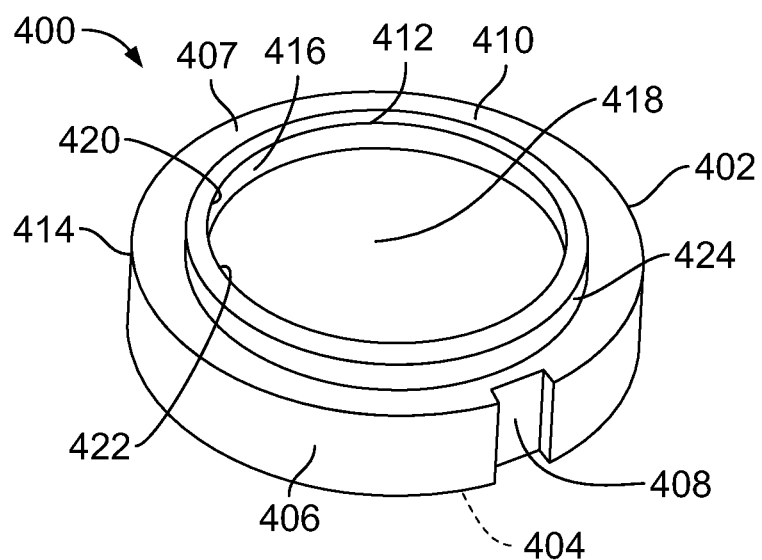
FIG. 4 illustrates a perspective top view of an insert of a connector support assembly, according to an embodiment of the present disclosure.

FIG. 4 illustrates a perspective top view of an insert 400 of a connector support assembly, according to an embodiment of the present disclosure. The insert 400 is an example of the insert 214 shown in FIG. 2. The insert 214 may be formed of plastic, for example. Alternatively, the insert 214 may be formed of various other materials, such as various metals.

The insert 400 includes a main body 402 that is configured to be positioned within the insert channel 310 of the base 300 (shown in FIG. 3). The main body 402 includes a lower surface 404 connected to an outer perimeter wall 406, which connects to an upper surface 407. The outer perimeter wall 406 may be shaped as a circle, and conforms to a shape of the internal wall 312 of the base 300. That is, the insert 400 is configured to be received and retained within the insert channel 310 such that the outer perimeter wall 406 abuts against the internal wall 312. The outer perimeter wall 406 forms the base connection interface 216 (shown in FIG. 2). Optionally, the base 300 and the insert 400 may be configured such that the base connection interface 216 is another feature of the insert 400, such as a stud extending downwardly from the lower surface 404 that is configured to be retained within a reciprocal channel formed in an upper surface of the base 300.

A notch 408 is formed into a portion of the perimeter wall 406. The notch 408 is sized and shaped to be reciprocal in shape to the securing protuberance 314 of the base 300. The notch 408 is configured to receive and retain the securing protuberance 314 so that the insert 400 does not rotate within the insert channel 310 of the base 300.

A shell connection interface 410 is formed on and/or in the upper surface 407. As shown, the shell connection interface 410 may include an annular rim 412 inwardly set from an outer edge 414. An annular recess 416 may be inwardly disposed from the rim 412 and separates the rim 412 from a central circular platform 418. The shell connection interface 410 is configured to securely retain a shell of a mating connector. For example, a lower edge of an outer wall portion of the shell may be configured to be press fit into the recess and compressively sandwiched between an inner surface 420 of the rim 412 and an outer surface 422 of the platform 418. Optionally, the shell may include a portion that is configured to abut into an outer surface 424 of the rim 412.

Figure 5:
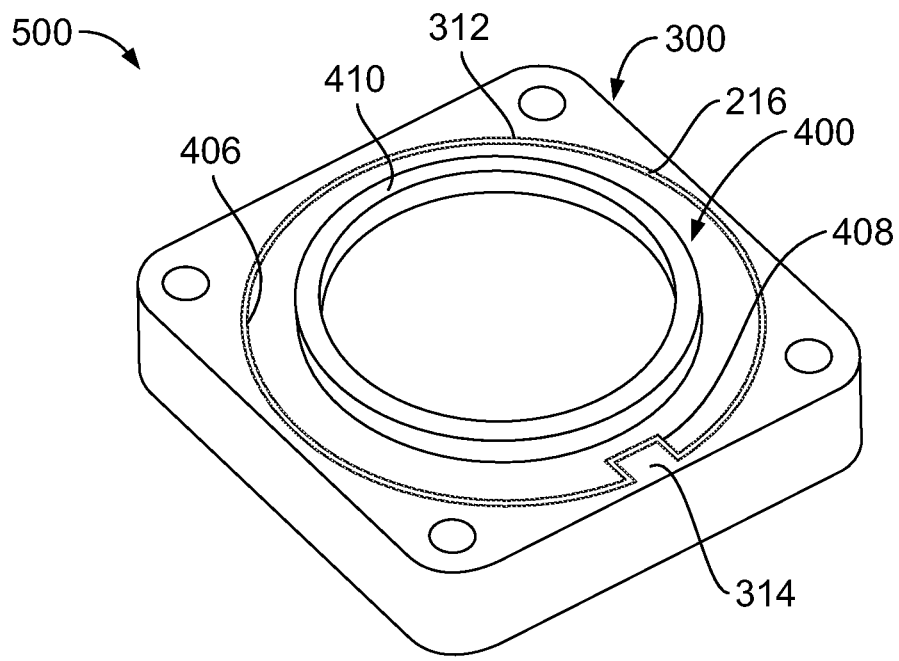
FIG. 5 illustrates a perspective top view of a connector support assembly, according to an embodiment of the present disclosure.

FIG. 5 illustrates a perspective top view of a connector support assembly 500, according to an embodiment of the present disclosure. The connector support assembly 500 is an example of the connector support assembly 210 shown in FIG. 2. The connector support assembly 500 includes the insert 400 removably retained and secured within the insert channel 310 of the base 300. As shown, the notch 408 of the insert 400 securely retains the securing protuberance 314 of the base 300, thereby preventing the insert 400 from rotating within the base 300. Optionally, the base 300 may include the notch, while the insert 400 may include the securing protuberance.

The shell connection interface 410 is configured to receive and securely retain (such as through a press or interference fit) a portion of a particular type of shell of a mating connector. If a different type of connector is to be assembled, the insert 400 may be removed from the base 300, and a compliant insert 400 having a commonly-shaped perimeter wall 406, but a different shell connection interface 410 may be inserted. As such, a single base 300 may be used to accommodate a variety of inserts, each of which may include a commonly-shaped base connection interface, and at least some of which may include a different shell connection interface.

Figure 6:
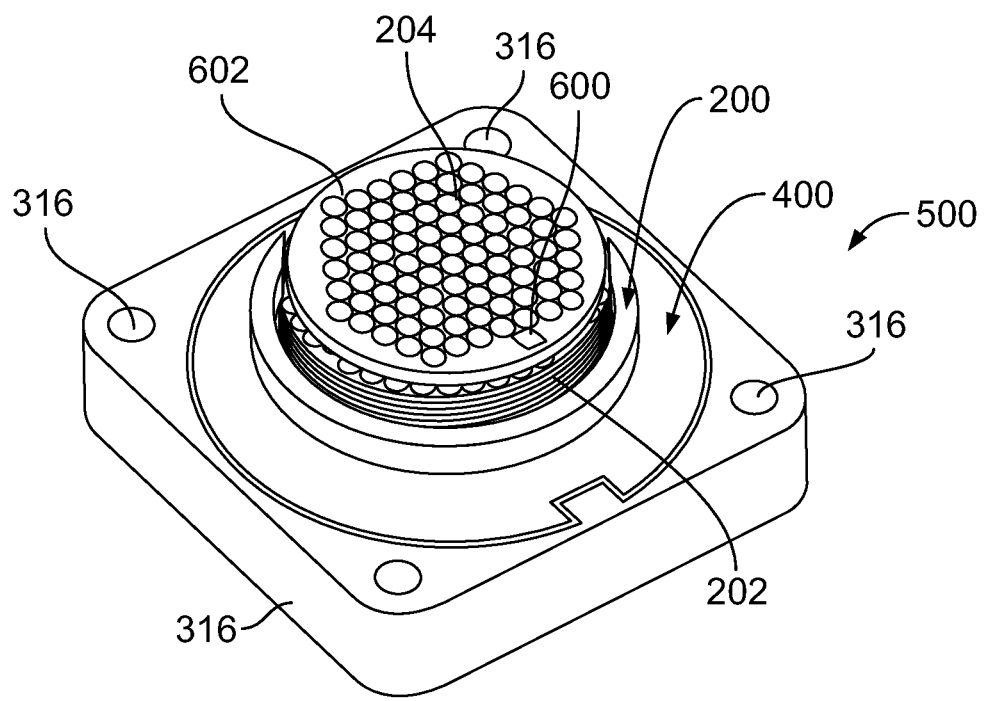
FIG. 6 illustrates a perspective top view of a connector support assembly securely supporting a mating connector, according to an embodiment of the present disclosure.

FIG. 6 illustrates a perspective top view of the connector support assembly 500 securely supporting the mating connector 200, according to an embodiment of the present disclosure. Referring to FIGS. 1-6, the shell 202 of the mating connector 200 is securely retained by the shell connection interface 410 of the insert 400. In order to properly align the mating connector 200 with the connector support assembly 500, the feature recognition system 114 detects a feature 600, such as a mark, divot, hole, protuberance, or the like, on a top surface 602 of the grommet 204 and determines a proper assembly orientation of the feature 600 in relation to the holes 316 of the base 300. The proper assembly orientation of the feature 600 (or features) of the mating connector 200 in relation to the feature(s) (such as the holes 316) of the base 300 defines an orientation of the mating connector 200 on the connector support assembly 500 that is used to accurately and efficiently affix one or more components to the mating connector through one or more automated systems during an assembling process. That is, the mating connector 200 is particularly oriented on the connector support assembly 500 in order for the automated systems to automatically and efficiently assemble or otherwise secure various components (such as wires) to the grommet 204 and/or the shell 202.

Figure 7:
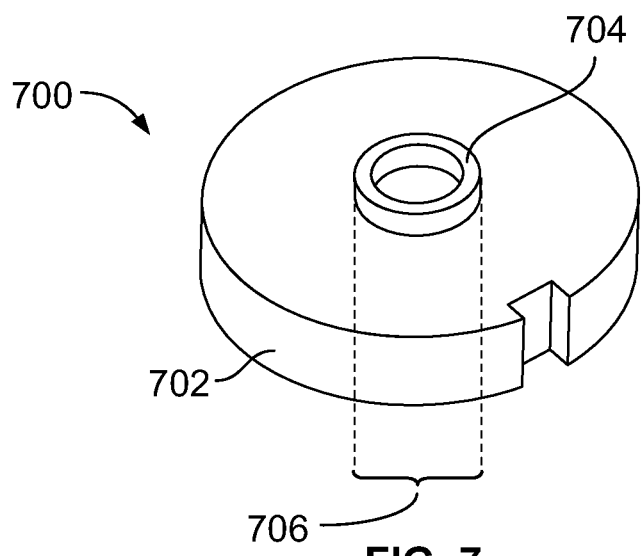
FIG. 7 illustrates a perspective top view of an insert of a connector support assembly, according to an embodiment of the present disclosure.

FIG. 7 illustrates a perspective top view of an insert 700 of a connector support assembly, according to an embodiment of the present disclosure. The insert 700 is an example of the insert 214 shown in FIG. 2. The insert 700 includes a perimeter wall 702 that is the same size and shape as that of the insert 400. However, the insert 700 includes a shell connection interface 704 that differs from that of the insert 400. For example, the shell connection interface 704 has a smaller diameter 706 than that of the insert 400. As such, the shell connection interface 704 is configured to securely retain a shell having a smaller diameter than a shell that may be retained by the insert 400.

Referring to FIGS. 3, 4, and 7, because the perimeter walls 406 and 702 have a common size and shape, the inserts 400 and 700 may be interchangeably positioned within the insert channel 310 of the base 300. That is, the base 300 is configured to interchangeably receive both of the inserts 400 and 700, each of which includes a different shell connection interface 410 and 704.

Figure 8:
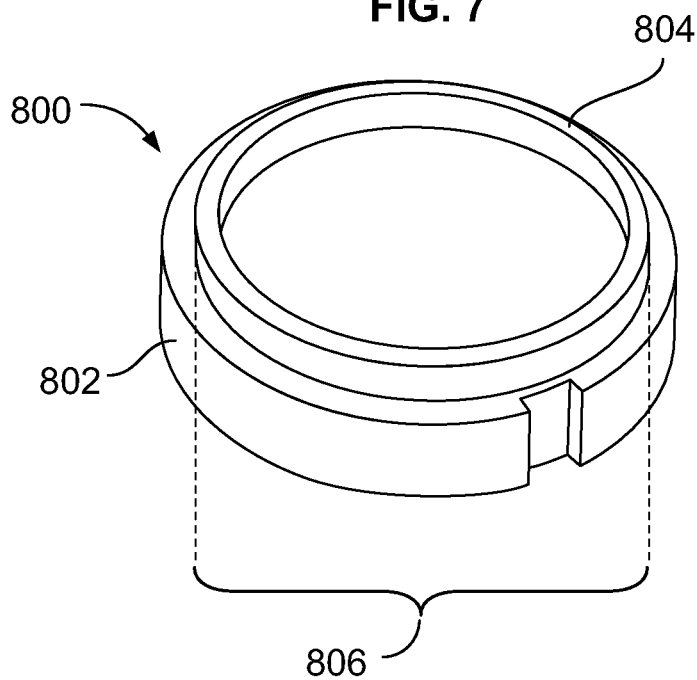
FIG. 8 illustrates a perspective top view of an insert of a connector support assembly, according to an embodiment of the present disclosure.

FIG. 8 illustrates a perspective top view of an insert 800 of a connector support assembly, according to an embodiment of the present disclosure. The insert 800 is an example of the insert 214 shown in FIG. 2. The insert 800 includes a perimeter wall 802 that is the same size and shape as that of the inserts 400 and 700. However, the insert 800 includes a shell connection interface 804 that differs from that of the inserts 400 and 700. For example, the shell connection interface 804 has a larger diameter 806 than that of the inserts 400 and 700. As such, the shell connection interface 804 is configured to securely retain a shell having a larger diameter than shells that may be retained by the inserts 400 and 700.

Referring to FIGS. 3, 4, 7, and 8, because the perimeter walls 406, 702, and 802 have a common size and shape, the inserts 400, 700, and 800 may be interchangeably positioned within the insert channel 310 of the base 300. That is, the base 300 is configured to interchangeably receive each of the inserts 400, 700, and 800, each of which includes a different shell connection interface 410, 704, and 804.

Figure 9:
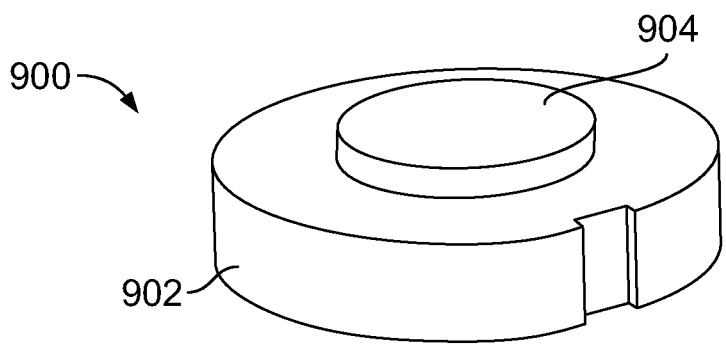
FIG. 9 illustrates a perspective top view of an insert of a connector support assembly, according to an embodiment of the present disclosure.

FIG. 9 illustrates a perspective top view of an insert 900 of a connector support assembly, according to an embodiment of the present disclosure. The insert 900 is an example of the insert 214 shown in FIG. 2. The insert 900 includes a perimeter wall 902 that is the same size and shape as that of the inserts 400, 700, and 800. However, the insert 900 includes a shell connection interface 904 that differs from that of the inserts 400, 700, and 800. For example, the shell connection interface 904 is a central circular platform.

Referring to FIGS. 3, 4, 7, 8, and 9, because the perimeter walls 406, 702, 802, and 902 have a common size and shape, the inserts 400, 700, 800, and 900 may be interchangeably positioned within the insert channel 310 of the base 300. That is, the base 300 is configured to interchangeably receive each of the inserts 400, 700, 800, and 900, each of which includes a different shell connection interface 410, 704, 804, and 904.

Figure 10:
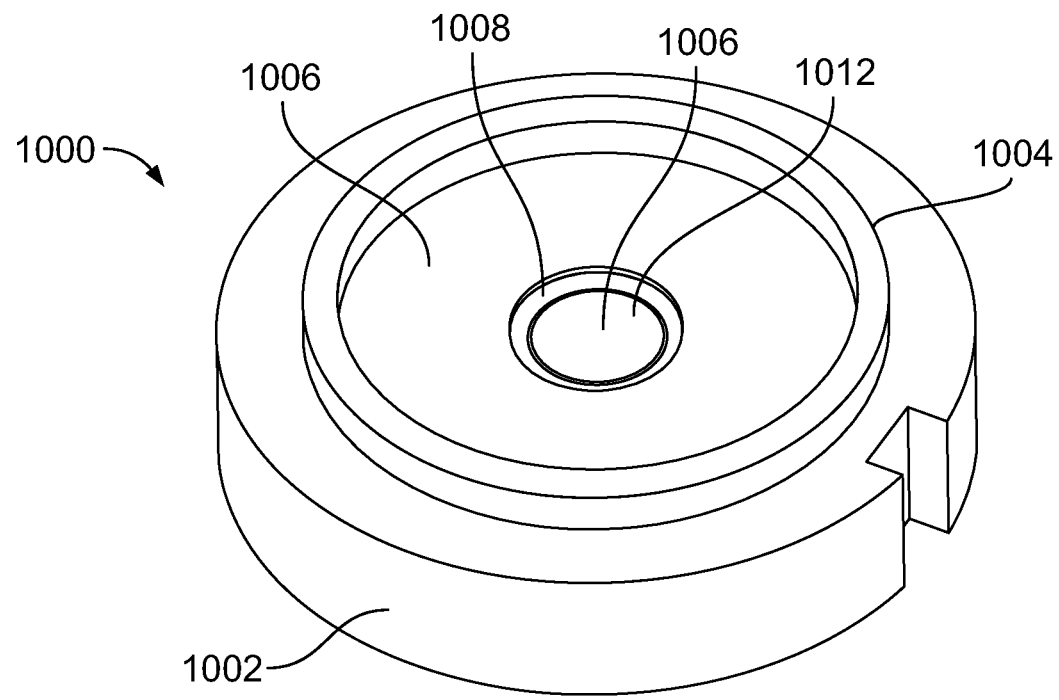
FIG. 10 illustrates a perspective top view of an insert of a connector support assembly, according to an embodiment of the present disclosure.

FIG. 10 illustrates a perspective top view of an insert 1000 of a connector support assembly, according to an embodiment of the present disclosure. The insert 1000 is an example of the insert 214 shown in FIG. 2. The insert 1000 includes a perimeter wall 902 that is the same size and shape as that of the inserts 400, 700, 800, and 900. However, the insert 1000 includes two shell connection interfaces 1004 and 1006, each of which is configured to securely retain a different shell. For example, the shell connection interface 1004 is configured to securely retain a shell having a larger diameter than the one that is configured to be retained by the shell connection interface 1006. By forming the insert 1000 with multiple connection interfaces 1004 and 1006, a total number of inserts may be reduced (thereby decreasing manufacturing and assembling costs), as the single insert 1000 is configured to accommodate multiple shells of different sizes. Optionally, the insert 1000 may include more shell connection interfaces than two.

Referring to FIGS. 3, 4, 7, 8, 9, and 10, because the perimeter walls 406, 702, 802, 902, and 1002 have a common size and shape, the inserts 400, 700, 800, 900, and 1000 may be interchangeably positioned within the insert channel 310 of the base 300. That is, the base 300 is configured to interchangeably receive each of the inserts 400, 700, 800, 900, and 1000, each of which includes a different shell connection interface 410, 704, 804, 904, 1004, and 1006, or combination of shell connection interfaces. For example, the shell connection interface 1004 may be the same size and shape as the shell connection interface 410. However, the combination of the shell connection interfaces 1004 and 1006 of the insert 1000 differs from the shell connection interface 410.

Additionally, as shown in FIG. 10, the shell connection interface 1006 may include a circular recess 1008 (instead of a rim) formed within an outer platform 1010. The circular recess 1008 separates the outer platform 1010 from a concentric internal platform 1012. Alternatively, instead of the recess 1008, an upstanding rim may upwardly extend from a central platform.

Figure 11:
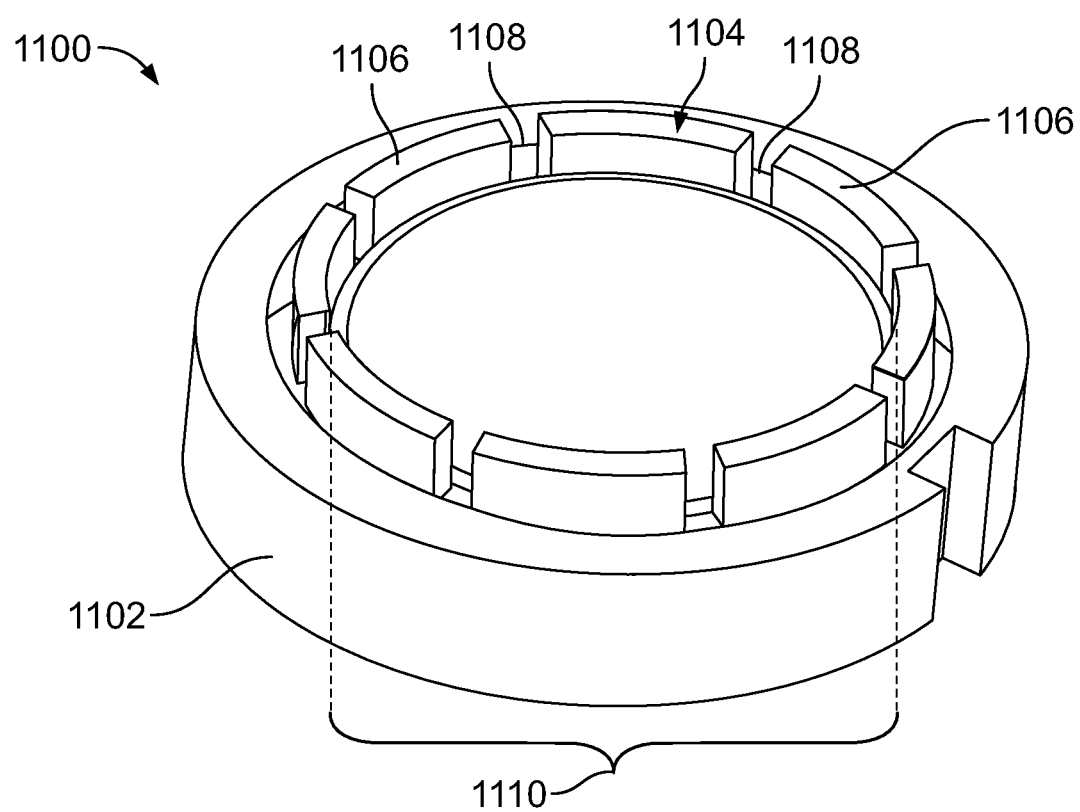
FIG. 11 illustrates a perspective top view of an insert of a connector support assembly, according to an embodiment of the present disclosure.

FIG. 11 illustrates a perspective top view of an insert 1100 of a connector support assembly, according to an embodiment of the present disclosure. The insert 1100 is an example of the insert 214 shown in FIG. 2. The insert 1100 includes a perimeter wall 1102 that is the same size and shape as that of the inserts 400, 700, 800, 900, and 1000. The insert 1100 includes a shell connection interface 1104 having a plurality of arcuate segments 1106 separated by gaps 1108. The arcuate segments 1106 collectively form a segmented ring having a diameter 1110 that is configured to accommodate a shell of a conforming inner circumference. The diameter 1110 may be larger or smaller than shown.

The segments 1106 are configured to be resilient and flexible. In at least one embodiment, the segments 1106 may be spring-biased in a radially outward position. As such, the segments 1106 are configured to exert an adaptable retaining force into an interior surface of a shell of a mating connector. The mating connector may have a particular tolerance, for example. Each of the segments 1106 is configured to bend and flex to comply with the tolerance. The segments 1106 are configured to outwardly flex and act as springs against an interior or exterior surface of a connector shell (depending on whether the shell fits around or within the segmented ring). Any of the embodiments of the present disclosure may include a shell connection interface having segments, similar to those shown and described with respect to FIG. 11.

Figure 12:
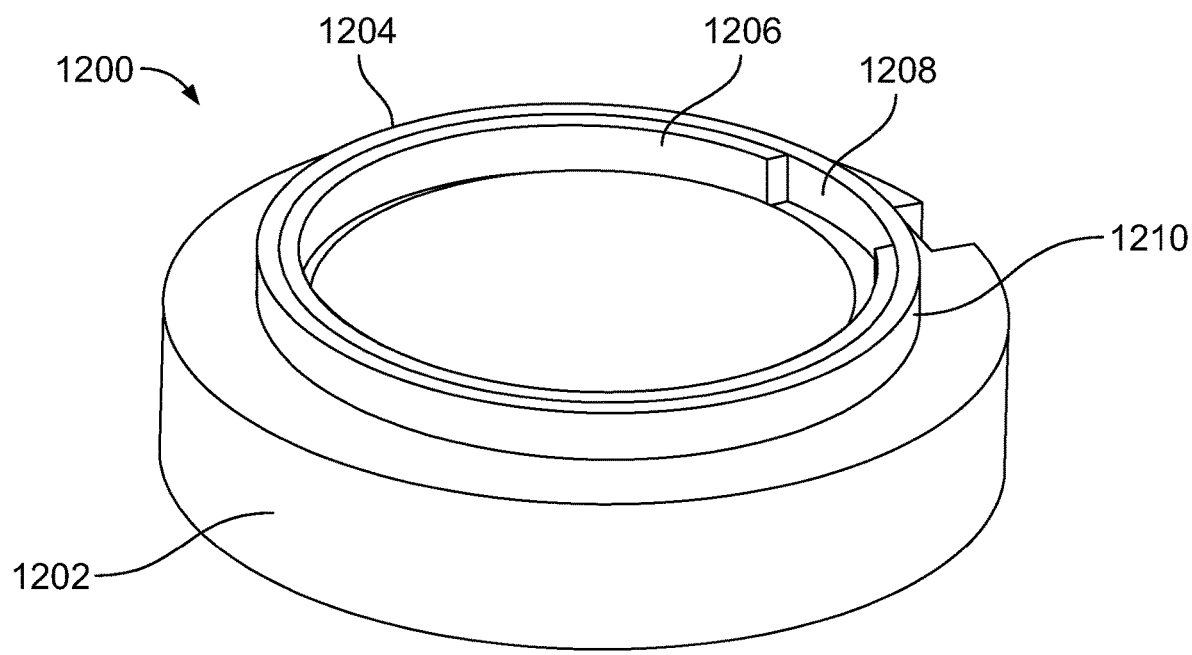
FIG. 12 illustrates a perspective top view of an insert of a connector support assembly, according to an embodiment of the present disclosure.

FIG. 12 illustrates a perspective top view of an insert 1200 of a connector support assembly, according to an embodiment of the present disclosure. The insert 1200 is an example of the insert 214 shown in FIG. 2. The insert 1200 includes a perimeter wall 1202 that is the same size and shape as that of the inserts 400, 700, 800, 900, 1000, and 1100. The insert 1200 includes a shell connection interface 1204 having a spring-biased brace 1206 (such as a C-ring) positioned within a recess 1208 and exerting an outward spring force into a rim 1210. The brace 1206 may be formed of a hard plastic or metal, for example. In particular, the brace 1206 may be formed of a harder more rigid material than the rim 1210. The brace 1206 braces the rim 1210, which may wear over time. The brace 1206 provides a resistive force that ensures that the rim 1210 fully engages a portion of a shell, for example. Any of the embodiments of the present disclosure may include a brace, similar to that shown and described with respect to FIG. 12.

Figure 13:
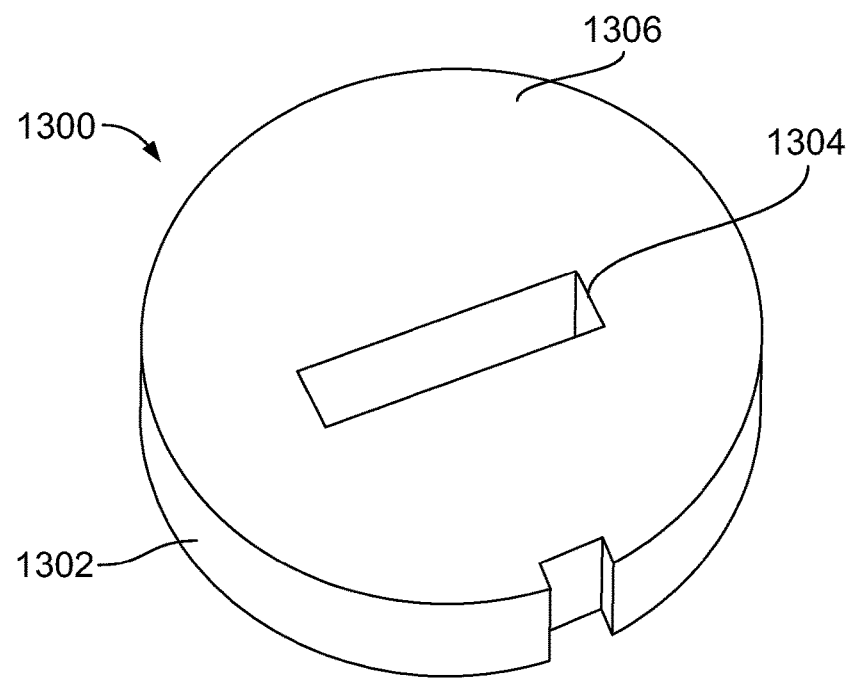
FIG. 13 illustrates a perspective top view of an insert of a connector support assembly, according to an embodiment of the present disclosure.

FIG. 13 illustrates a perspective top view of an insert 1300 of a connector support assembly, according to an embodiment of the present disclosure. The insert 1300 is an example of the insert 214 shown in FIG. 2. The insert 1300 includes a perimeter wall 1302 that is the same size and shape as that of the inserts 400, 700, 800, 900, 1000, 1100, and 1200. The insert 1300 includes a shell connection interface 1304 that is configured to receive and retain a non-circular portion of a mating connector. For example, the shell connection interface 1304 may include a rectangular block-shaped channel formed into a top surface 1306. The channel is configured to form a complementary shape of a shell of a mating connector.

Figure 14:
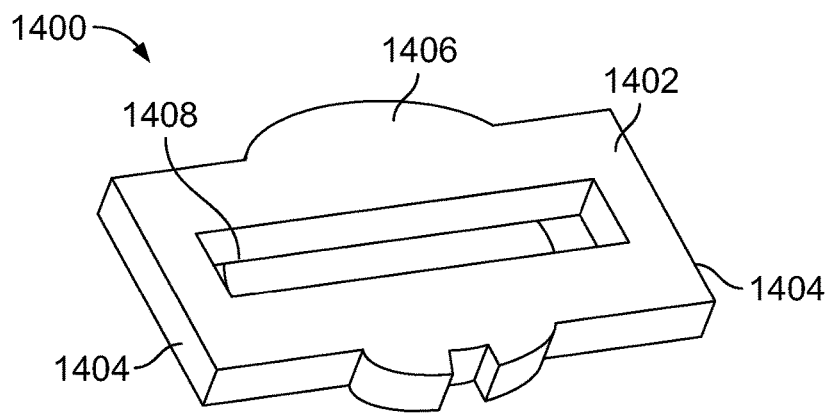
FIG. 14 illustrates a perspective top view of an insert of a connector support assembly, according to an embodiment of the present disclosure.

FIG. 14 illustrates a perspective top view of an insert 1400 of a connector support assembly, according to an embodiment of the present disclosure. The insert 1400 is configured to retain a portion of a rectangular shell of a mating connector that is relatively long. Accordingly, the insert 1400 includes an expanded main body 1402 having wings 1404 that extend outwardly from a central portion 1406. A shell connection interface 1408 is formed within the main body 1402 and extends between the wings 1404.

Figure 15:
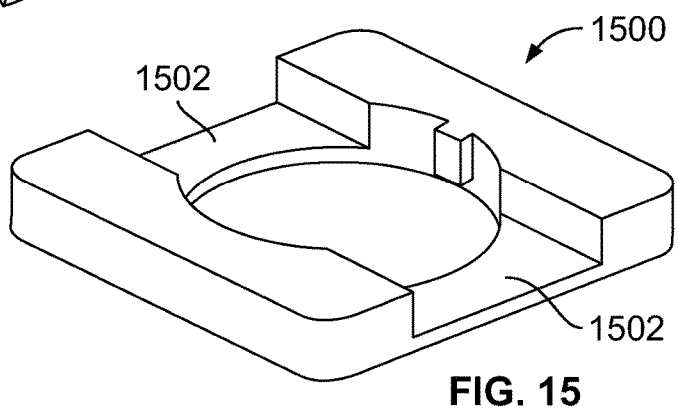
FIG. 15 illustrates a perspective top view of a base of a connector support assembly, according to an embodiment of the present disclosure.

FIG. 15 illustrates a perspective top view of a base 1500 of a connector support assembly, according to an embodiment of the present disclosure. The base 1500 is similar to the base 300, except that the base 1500 includes lateral recesses 1502 that are configured to allow the wings 1404 to extend.

Figure 16:
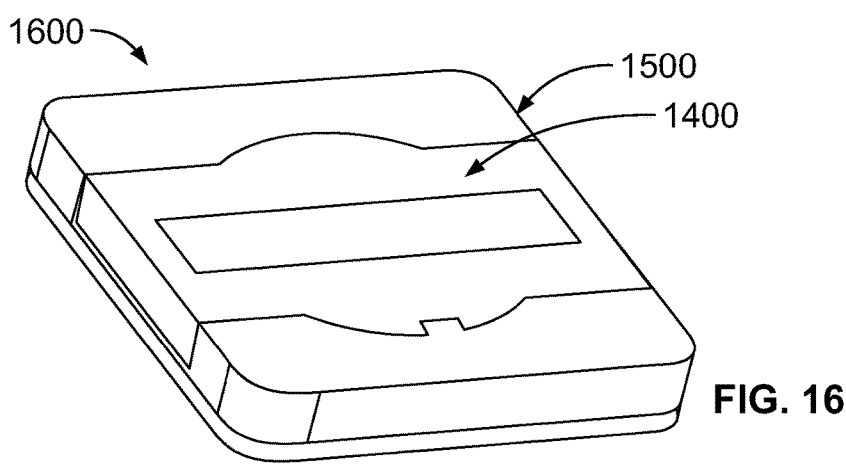
FIG. 16 illustrates a perspective top view of a connector support assembly, according to an embodiment of the present disclosure.

FIG. 16 illustrates a perspective top view of the connector support assembly 1600, according to an embodiment of the present disclosure. The insert 1400 is retained by the base 1500. The insert 1400 may be removed from the base 1500 and a different insert having a different shell connection interface may be inserted into the base 1500.

Figure 17:
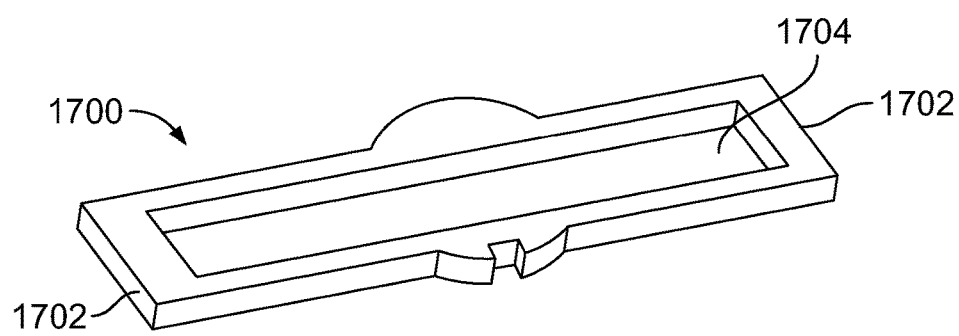
FIG. 17 illustrates a perspective top view of an insert of a connector support assembly, according to an embodiment of the present disclosure.

FIG. 17 illustrates a perspective top view of an insert 1700 of a connector support assembly, according to an embodiment of the present disclosure. The insert 1700 is similar to the insert 1400 except that the insert 1700 includes longer wings 1702 that define, in part, a longer shell connection interface 1704. The base 1500 shown in FIGS. 15 and 16 may retain the insert 1700.

Figure 18:
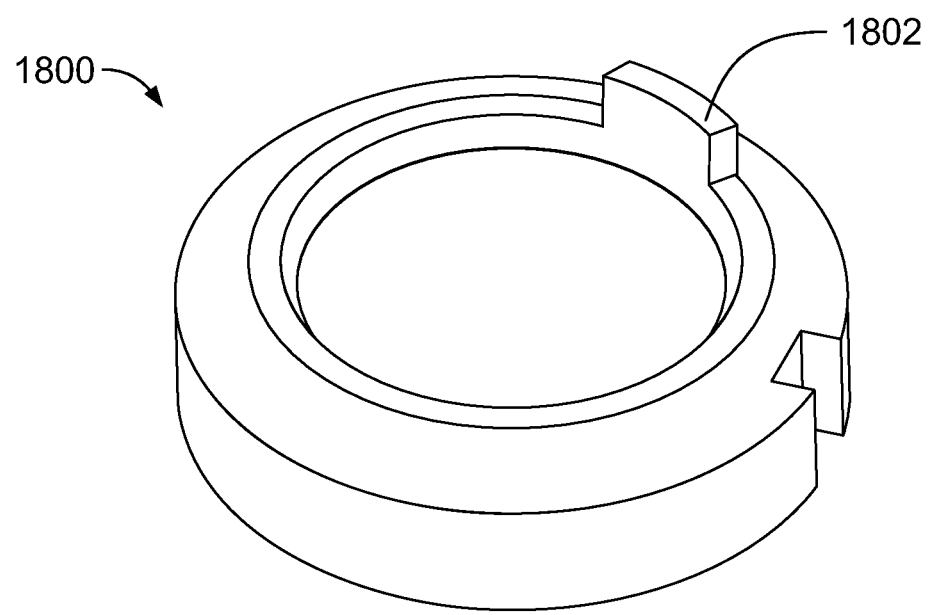
FIG. 18 illustrates a perspective top view of an insert of a connector support assembly, according to an embodiment of the present disclosure.

FIG. 18 illustrates a perspective top view of an insert 1800 of a connector support assembly, according to an embodiment of the present disclosure. The insert 1800 may include a key 1802, such as an upwardly extending tab, that may be used to align the insert 1800 with a reciprocal feature of a shell of a mating connector. In this manner, the insert 1800 may be used by an individual to manually properly align the mating connector with the connector support assembly (such as if there is no feature recognition system available). Alternatively, the key 1802 may include a divot that receive a reciprocal tab of the shell.

Figure 19:
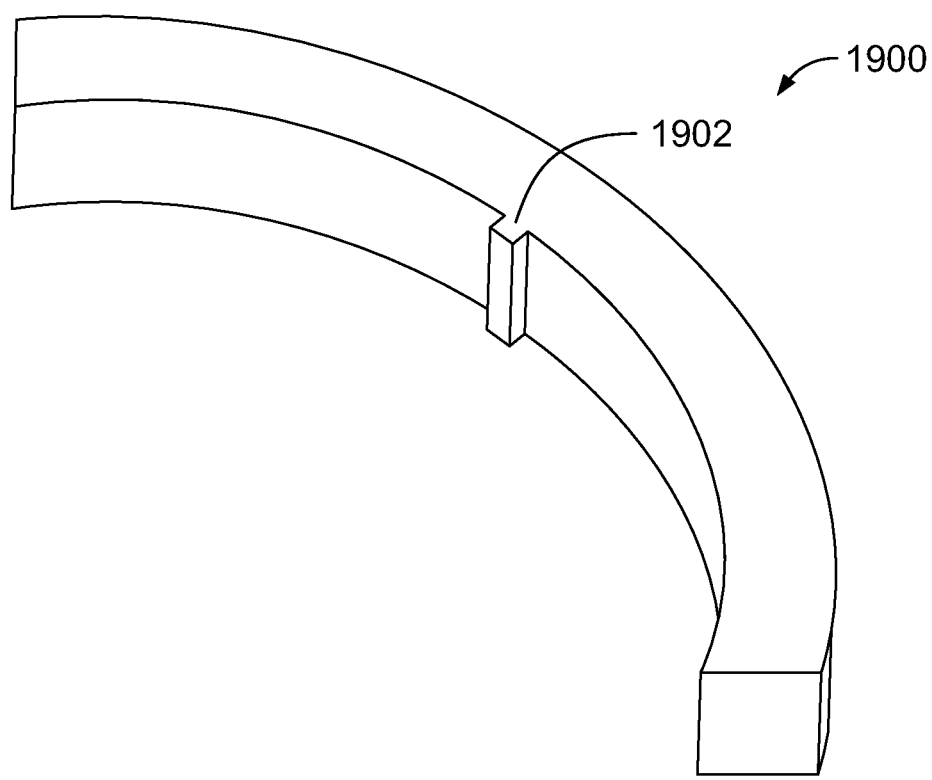
FIG. 19 illustrates a perspective top view of an insert of a connector support assembly, according to an embodiment of the present disclosure.

FIG. 19 illustrates a perspective top view of an insert 1900 of a connector support assembly, according to an embodiment of the present disclosure. The insert 1900 may include a key 1902, such as inwardly-directed tab, that may be used to align the insert 1900 with a reciprocal feature of a shell of a mating connector. In this manner, the insert 1900 may be used to an individual to manually properly align the mating connector with the connector support assembly (such as if there is no feature recognition system available). Alternatively, the key 1902 may include a notch that receives a reciprocal tab of the shell.

Figure 20:
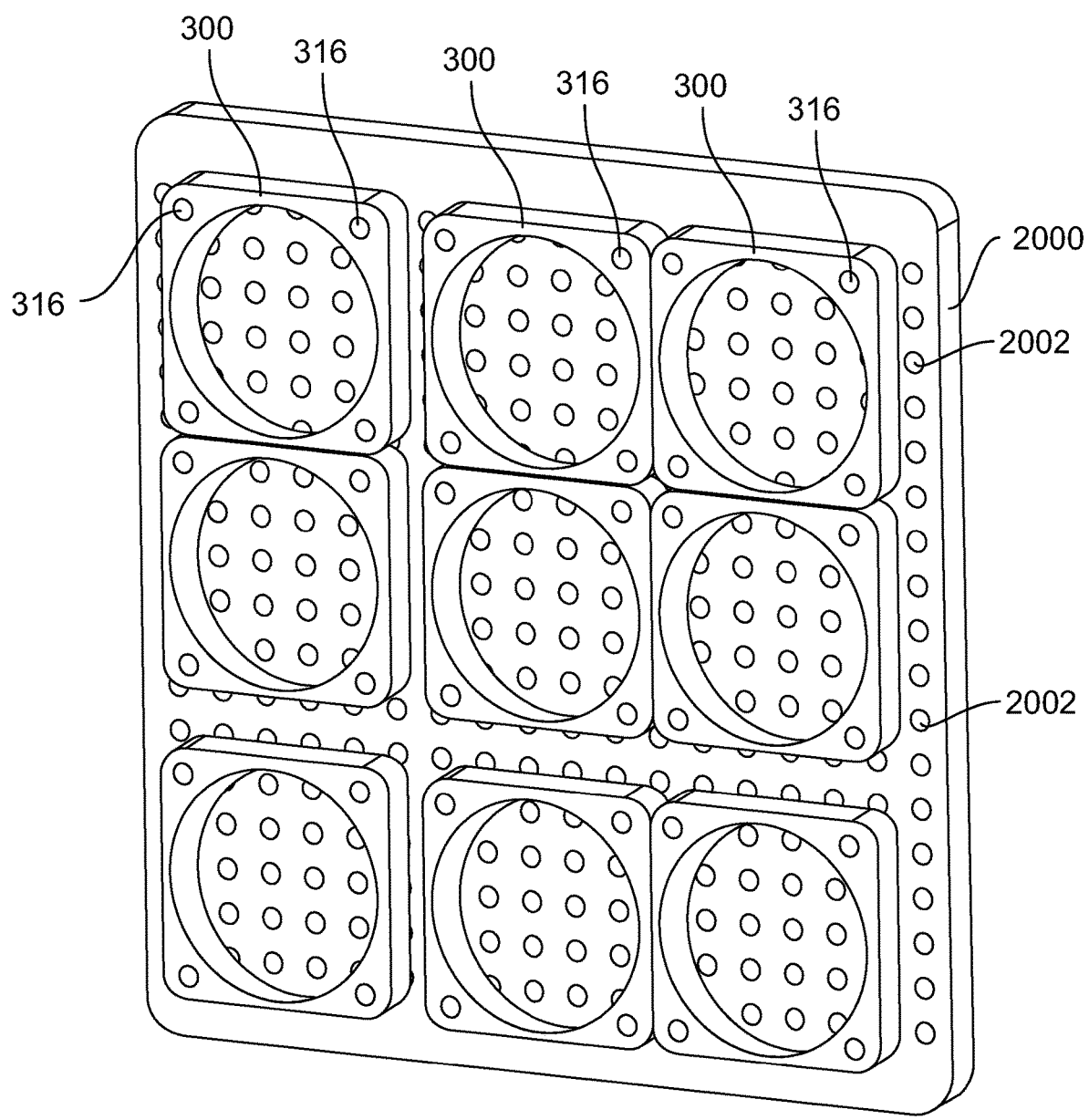
FIG. 20 illustrates a perspective top view of a plurality of bases secured to a pallet, according to an embodiment of the present disclosure.

FIG. 20 illustrates a perspective top view of a plurality of bases 300 secured to a pallet 2000, according to an embodiment of the present disclosure. The pallet 2000 is an example of the pallet 220 shown in FIG. 2, and is used to convey connector support assemblies supporting mating connectors on a conveyor to one or more assembling stations, for example.

Each base 300 may be secured to the pallet 2000 by aligning the holes 316 with holes 2002 of the pallet 2000. Fasteners, such as rods, pins, bolts, screws, and/or the like are passed through the aligned holes 316 and 2002 to secure the bases 300 to the pallet 2000. The pallet 2000 may securely support more or less bases 300 than shown. Further, additional securing interfaces between the pallet 2000 and the bases 300 may be used. For example, bottom portions of the bases 300 may clip to reciprocal protuberances extending from the pallet 2000. Also, other types of bases than shown may be secured to the pallet 2000.

Referring to FIGS. 1-20, various shell connection interfaces other than shown in the Figures of the present application may be used. For example, where a rim is shown in the Figures, a recess may be alternatively used. Further, where a recess is shown in the Figures, an upstanding rim may be alternatively used. Additionally, while the shell connection interfaces are shown as circular, the shell connection interfaces may be various other shapes and sizes, such as ovoid, elliptical, square, rectangular, triangular, or the like.

Figure 21:
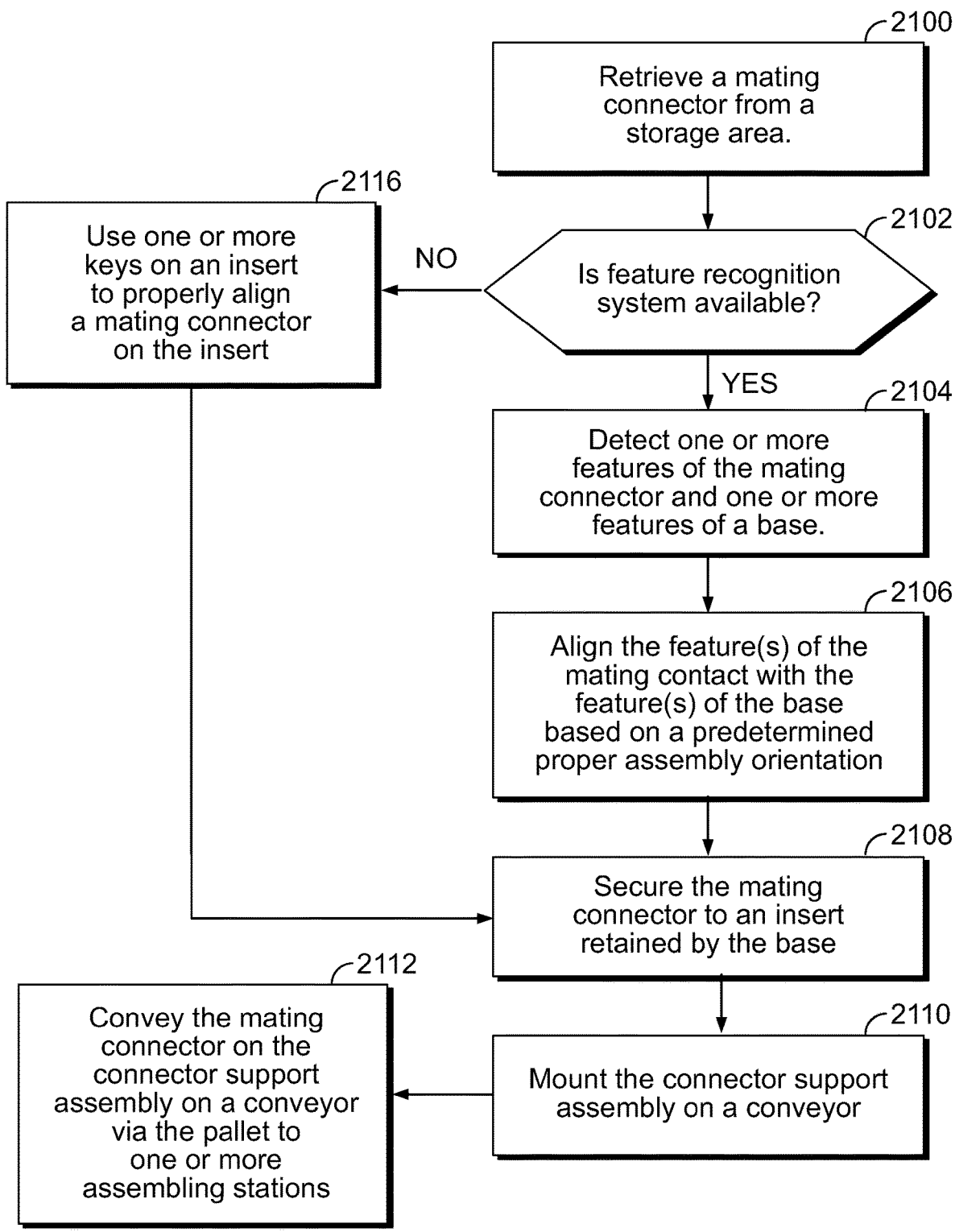
FIG. 21 illustrates a flow chart of a method of assembling an electrical connector, according to an embodiment of the present disclosure.

FIG. 21 illustrates a flow chart of a method of assembling an electrical connector, according to an embodiment of the present disclosure. The method beings at 2100, in which a mating connector is retrieved from a storage area. At 2102, it is determined if a feature recognition system is available. If so, the method proceeds from 2102 to 2104, in which the feature recognition system detects one or more features of the mating connector and one or more features of a base into which an insert is to be positioned. Then, at 2106, the feature(s) of the mating contact are aligned with or otherwise oriented in relation to the feature(s) of the base based on a predetermined proper assembly orientation of the mating contact and the base. For example, an engaging robot may move the mating contact and the base into a proper assembly orientation. Once in the proper assembly orientation, the mating connect is secured to the insert at 2108, such as by the engaging robot urging the mating contact into a press fit with an insert retained by the base. Then at 2110, the connector support assembly, which includes the base and the insert onto which the mating connector is secured, is mounted to a pallet, which is then positioned on a conveyor. At 2112, the connector support assembly that supports the mating connector is conveyed on a conveyor via the pallet to one or more assembling stations that secure one or more components to the mating connector to form a fully-formed electrical connector.

If, however, at 2102, a feature recognition system is not available, the method proceeds from 2102 to 2116, in which one or more keys of an insert are used to properly align a mating connector on the insert. The method then proceeds from 2116 to 2108.

The control unit 150 of FIG. 1 may be used to control operation of the method shown and described with respect to FIG. 21. The control unit 150 may be a single control unit that is in communication with the engaging robots and the feature recognition system, or the control unit 150 may be distributed (for example, multiple control units) among the various systems (for example, the feature recognition system may include a control unit that is in communication with a control unit of the engaging robot). The control unit 150 may be programmed to operate the system 100 according to the method shown and described with respect to FIG. 21.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

The control unit 150, for example, is configured to execute a set of instructions that are stored in one or more storage elements (such as one or more memories), in order to process data. For example, the control unit 150 may include or be coupled to one or more memories. The storage elements may also store data or other information as desired or needed. The storage elements may be in the form of an information source or a physical memory element within a processing machine.

The set of instructions may include various commands that instruct the control unit 150 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 150 shown in FIG. 1. It is to be understood that the processing or control units may represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Referring to FIGS. 1-21, embodiments of the present disclosure provide automated systems and methods of assembling electrical connectors. The systems and methods may automatically retrieve a mating connector and align the mating connector with a connector support assembly in a proper assembly orientation. The systems and methods may securely position the properly-oriented mating connector onto the connector support assembly.

The connector support assembly may include a base that is configured to interchangeably retain a plurality of inserts, some of which may include different shell connection interfaces. The base may include an insert channel that is configured to receive and retain a perimeter wall of each of the inserts. The perimeter walls of the inserts may have a common size and shape. As such, the base may be a universal structure that is configured to support a wide range of inserts, which, in turn, are configured to support a variety of different mating connectors having different shapes and sizes. The shell connection interface of each insert may be or include a friction structure, such as a post, that is configured to allow a shell of the connector to be press fit thereon or therein.

Embodiments of the present disclosure provide connector support assemblies having a base and interchangeable inserts. As such, a single base may be used to accommodate different inserts. Each insert may include a single shell connection interface, or multiple connection interfaces. The common base and interchangeable inserts reduces a number of unique supports used for manufacturing and assembling an electrical connector, thereby reducing manufacturing and assembling costs.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A connector support assembly configured to securely retain a mating connector during an assembling process of an electrical connector, the connector support assembly comprising:
 a universal base including an insert channel;
 a plurality of inserts configured to be interchangeably retained within the insert channel, wherein each of the plurality of inserts includes (a) a base connection interface having a common shape and size that is configured to be retained by the universal base within the insert channel, and (b) at least one shell connection interface, wherein the at least one shell connection interface of at least two of the plurality of inserts differ in one or both of size or shape and are configured to retain different sized shells of different mating connectors.

2. The connector support assembly of claim 1, wherein the base connection interface comprises an outer perimeter wall.

3. The connector support assembly of claim 1, wherein the universal base or the base connection interface comprises a securing protuberance or a reciprocal notch, and wherein the other of the universal base or the base connection interface comprises the other of the securing protuberance or the reciprocal notch, wherein the securing protuberance is retained by the reciprocal notch to prevent rotation of the plurality of inserts within the insert channel.

4. The connector support assembly of claim 1, wherein the universal base comprises at least one hole that is configured to align with at least one pallet hole of a pallet to secure the universal base to the pallet through at least one fastener.

5. The connector support assembly of claim 4, wherein the at least one hole defines a feature that is configured to be detected by a feature recognition system and compared with another feature of the mating connector to align the mating connector on the connector support assembly in a proper assembly orientation.

6. The connector support assembly of claim 1, wherein the at least one shell connection interface includes one or more of an upstanding rim, a recess, or a platform.

7. The connector support assembly of claim 1, wherein the at least one shell connection interface comprises at least two separate and distinct shell connection interfaces each of which is configured to retain a different sized or shaped shell.

8. The connector support assembly of claim 1, wherein the at least one shell connection interface comprises a plurality of arcuate segments separated by gaps.

9. The connector support assembly of claim 1, wherein the at least one shell connection interface comprises a spring-biased brace positioned within a recess and exerting an outward spring force into a rim.

10. The connector support assembly of claim 1, wherein the at least one shell connection interface comprises a block-shaped recess.

11. The connector support assembly of claim 1, wherein at least one of the plurality of inserts comprises wings extending from a central portion, and wherein the at least one shell connection interface extends between the wings and the central portion.

12. The connector support assembly of claim 1, wherein at least one of the plurality of inserts comprises a key that is configured to allow the mating connector to be manually aligned with respect to the at least one of the plurality of inserts in a proper assembly orientation.

13. A system for assembling an electrical connector, the system comprising:
a mating connector; and
a connector support assembly that retains the mating connector during an assembling process of the electrical connector, the connector support assembly including:
a universal base including an insert channel; and
an insert interchangeably retained within the insert channel, wherein the insert includes (a) a base connection interface having a shape and size that is the same as a plurality of other inserts, and (b) at least one shell connection interface, wherein the at least one shell connection interface differs in one or both of size or shape from at least one of the plurality of other inserts, wherein the mating connector is firmly secured on or in the at least one shell connection interface.

14. The system of claim 13, further comprising a feature recognition system configured to detect a first feature of the mating connector and a second feature of the universal base, wherein a proper assembly orientation between the first and second features is determined.

15. The system of claim 14, wherein the feature recognition system determines the proper assembly orientation.

16. The system of claim 14, further comprising a control unit in communication with the feature recognition system, wherein the control unit determines the proper assembly orientation.

17. The system of claim 14, further comprising an engaging robot configured to move the mating connector into the proper assembly orientation in relation to the universal base and firmly secure the mating connector to the at least one shell connection interface.

18. The system of claim 13, further comprising:
a pallet on which the connector support assembly is secured; and
a conveyor onto which the pallet is moveably secured.

19. The system of claim 18, further comprising at least one assembling station disposed along the conveyor, wherein the mating connector secured on the connector support assembly is configured to be conveyed to the at least one assembling station on the pallet by way of the conveyor.

20. The system of claim 13, wherein the base connection interface comprises an outer perimeter wall.

21. The system of claim 13, wherein the universal base or the base connection interface comprises a securing protuberance or a reciprocal notch, and wherein the other of the universal base or the base connection interface comprises the other of the securing protuberance or the reciprocal notch, wherein the securing protuberance is retained by the reciprocal notch to prevent rotation of the insert within the insert channel.

22. The system of claim 13, wherein the universal base comprises at least one hole that is configured to align with at least one pallet hole of a pallet to secure the universal base to the pallet through at least one fastener.

23. The system of claim 22, wherein the at least one hole defines a feature that is configured to be detected by a feature recognition system and compared with another feature of the mating connector to align the mating connector on the connector support assembly in a proper assembly orientation.

24. The system of claim 13, wherein the at least one shell connection interface includes one or more of an upstanding rim, a recess, or a platform.

25. The system of claim 13, wherein the at least one shell connection interface comprises at least two separate and distinct shell connection interfaces each of which is configured to retain a different sized or shaped shell.

26. The system of claim 13, wherein the at least one shell connection interface comprises a plurality of arcuate segments separated by gaps.

27. The system of claim 13, wherein the at least one shell connection interface comprises a spring-biased brace positioned within a recess and exerting an outward spring force into a rim.

28. The system of claim 13, wherein the at least one shell connection interface comprises a block-shaped recess.

29. The system of claim 13, wherein the insert comprises wings extending from a central portion, and wherein the shell connection interface extends between the wings and the central portion.

30. The system of claim 13, wherein the insert comprises a key that is configured to allow the mating connector to be manually aligned with respect to the insert in a proper assembly orientation.

31. A method for assembling an electrical connector, the method comprising:

interchangeably securing an insert within an insert channel of a universal base to provide a connector support assembly that is configured to retain a mating connector during an assembling process of the electrical connector, wherein the insert includes (a) a base connection interface having a shape and size that is the same as a plurality of other inserts, and (b) at least one shell connection interface, wherein the at least one shell connection interface differs in one or both of size or shape from at least one of the plurality of other inserts; and firmly securing a mating connector on or in the at least one shell connection interface.

32. The method of claim 31, further comprising:
using a feature recognition system to detect a first feature of the mating connector and a second feature of the universal base; and
determining a proper assembly orientation between the first and second features.

33. The method of claim 32, wherein the determining comprises using the feature recognition system to determine the proper assembly orientation.

34. The method of claim 32, wherein the determining comprises using a control unit in communication with the feature recognition system to determine the proper assembly orientation.

35. The method of claim 32, further comprising using an engaging robot to move the mating connector into the proper assembly orientation in relation to the universal base and firmly secure the mating connector to the at least one shell connection interface.

36. The method of claim 31, further comprising:
securing the connector support assembly on a pallet; and
moveably securing the pallet on a conveyor.

37. The method of claim 36, conveying the mating connector on the pallet to a at least one assembling station on by way of the conveyor.

* * * * *